United States Patent
Dusanapudi et al.

(10) Patent No.: US 10,261,878 B2
(45) Date of Patent: *Apr. 16, 2019

(54) STRESS TESTING A PROCESSOR MEMORY WITH A LINK STACK

(71) Applicant: International Business Machines Corporation, Armonk, NY (US)

(72) Inventors: Manoj Dusanapudi, Bangalore (IN); Shakti Kapoor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/458,118

(22) Filed: Mar. 14, 2017

(65) Prior Publication Data
US 2018/0267875 A1    Sep. 20, 2018

(51) Int. Cl.
G06F 11/00      (2006.01)
G06F 11/263     (2006.01)

(52) U.S. Cl.
CPC .......... G06F 11/263 (2013.01); G06F 11/008 (2013.01)

(58) Field of Classification Search
CPC .. G06F 11/3664; G06F 11/3466; G06F 11/00; G06F 11/22
USPC .......................................................... 714/35
See application file for complete search history.

(56) References Cited

U.S. PATENT DOCUMENTS

| | | |
|---|---|---|
| 5,165,029 A | 11/1992 | Sawai et al. |
| 5,276,833 A | 1/1994 | Auvinen et al. |
| 5,287,481 A | 2/1994 | Lin |
| 5,513,344 A | 4/1996 | Nakamura |
| 5,537,572 A | 7/1996 | Michelsen et al. |
| 5,539,878 A | 7/1996 | Kikinis |
| 5,671,231 A | 9/1997 | Cooper |
| 5,704,035 A | 12/1997 | Shipman |
| 5,745,508 A | 4/1998 | Prohofsky |

(Continued)

FOREIGN PATENT DOCUMENTS

| | | |
|---|---|---|
| CN | 103140828 A | 6/2013 |
| EP | 0805390 B1 | 2/2003 |
| KR | 101467623 | 12/2014 |

OTHER PUBLICATIONS

Dusanapudi et al., "Replicating Test Case Data Into a Cache With Non-Naturally Aligned Data Boundaries" U.S. Appl. No. 15/010,051, filed Jan. 29, 2016.

(Continued)

Primary Examiner — Sarai E Butler
(74) Attorney, Agent, or Firm — Martin & Associates, LLC; Bret J. Petersen (57) ABSTRACT

A processor memory is stress tested with a variable link stack depth using link stack test segments with non-naturally aligned data boundaries. Link stack test segments are interspersed into test code of a processor memory tests to change the link stack depth without changing results of the test code. The link stack test segments are the same structure as the segments of the test code and have non-naturally aligned boundaries. The link stack test segments include branch to target, push/pop, push and pop segments. The depth of the link stack is varied independent of the memory test code by changing the number to branches in the branch to target segment and varying the number of the push/pop segments.

12 Claims, 9 Drawing Sheets

(56) References Cited

U.S. PATENT DOCUMENTS

| | | | |
|---|---|---|---|
| 5,831,987 A | 11/1998 | Spilo | |
| 6,012,125 A | 1/2000 | Tran | |
| 6,044,478 A | 3/2000 | Green | |
| 6,070,238 A | 5/2000 | Feiste et al. | |
| 6,192,515 B1 | 2/2001 | Doshi et al. | |
| 6,594,731 B1 | 7/2003 | Hertwig et al. | |
| 6,658,534 B1 | 12/2003 | White et al. | |
| 6,754,857 B2 | 6/2004 | Liang | |
| 7,133,975 B1 | 11/2006 | Isaac et al. | |
| 7,203,872 B2 | 4/2007 | Frodsham et al. | |
| 7,254,509 B1 | 8/2007 | Johnson | |
| 7,647,539 B2 | 1/2010 | Bussa et al. | |
| 7,669,083 B2 | 2/2010 | Arora et al. | |
| 7,743,305 B2 | 6/2010 | Yamada | |
| 7,752,499 B2 | 7/2010 | Choudhury et al. | |
| 7,788,610 B2 | 8/2010 | Emek et al. | |
| 7,925,866 B2 | 4/2011 | Greenhalgh et al. | |
| 7,992,059 B2 | 8/2011 | Anvekar et al. | |
| 8,015,362 B2 | 9/2011 | Alexander et al. | |
| 8,161,432 B2 | 4/2012 | Wang et al. | |
| 8,161,440 B2 | 4/2012 | Emek et al. | |
| 8,645,669 B2 | 2/2014 | Alexander et al. | |
| 8,726,044 B2 | 5/2014 | Hameed et al. | |
| 9,317,460 B2 | 4/2016 | Greiner et al. | |
| 9,612,929 B1 | 4/2017 | Dusanapudi et al. | |
| 9,665,486 B2 | 5/2017 | Habermann et al. | |
| 9,892,039 B2 | 2/2018 | Luttrell et al. | |
| 2002/0040285 A1 | 4/2002 | Boehm | |
| 2003/0122584 A1 | 7/2003 | Boehm | |
| 2004/0078699 A1 | 4/2004 | Thompson et al. | |
| 2005/0071817 A1 | 3/2005 | DeWitt, Jr. et al. | |
| 2006/0248319 A1 | 11/2006 | Kadambi | |
| 2008/0126771 A1 | 5/2008 | Chen et al. | |
| 2008/0168562 A1* | 7/2008 | Haga | G06F 21/14 726/23 |
| 2008/0258749 A1 | 10/2008 | Yamada | |
| 2009/0024886 A1 | 1/2009 | Arora et al. | |
| 2009/0070570 A1 | 3/2009 | Choudhury et al. | |
| 2009/0070632 A1 | 3/2009 | Bag et al. | |
| 2009/0089564 A1 | 4/2009 | Brickell et al. | |
| 2009/0070532 A1 | 5/2009 | Bussa et al. | |
| 2011/0078521 A1 | 3/2011 | He et al. | |
| 2011/0213926 A1 | 9/2011 | Ledford | |
| 2011/0276764 A1 | 11/2011 | Alexander et al. | |
| 2012/0079346 A1 | 3/2012 | Fukuda | |
| 2012/0102302 A1 | 4/2012 | Bansal et al. | |
| 2012/0221903 A1 | 8/2012 | Ohnuma | |
| 2013/0007425 A1 | 1/2013 | Cantin et al. | |
| 2013/0047140 A1* | 2/2013 | Shann | G06F 11/3664 717/128 |
| 2013/0339327 A1 | 12/2013 | Belmar et al. | |
| 2014/0032966 A1 | 1/2014 | Dusanapudi et al. | |
| 2014/0129773 A1 | 5/2014 | Habermann et al. | |
| 2014/0195786 A1 | 7/2014 | Gilkerson et al. | |
| 2015/0026445 A1 | 1/2015 | Bansal et al. | |
| 2015/0134933 A1 | 5/2015 | Holm et al. | |
| 2015/0143057 A1 | 5/2015 | Pavlou et al. | |
| 2015/0221396 A1 | 8/2015 | Subramaniam et al. | |
| 2015/0234700 A1 | 8/2015 | Qin et al. | |
| 2015/0347134 A1 | 12/2015 | Gschwind et al. | |
| 2016/0162381 A1 | 6/2016 | Hendrickson et al. | |
| 2016/0349322 A1 | 12/2016 | Shibahara et al. | |
| 2018/0146454 A1* | 5/2018 | Wang | H04W 4/80 |

OTHER PUBLICATIONS

Dusanapudi et al., "Replicating Test Case Data Into a Cache With Non-Naturally Aligned Data Boundaries" U.S. Appl. No. 15/065,279, filed Mar. 9, 2016.

Dusanapudi et al., "Replicating Test Case Data Into a Cache With Non-Naturally Aligned Data Boundaries" U.S. Appl. No. 15/244,799, filed Aug. 23, 2016.

Dusanapudi et al., "Replicating Test Code and Test Data Into a Cache With Non-Naturally Aligned Data Boundaries" U.S. Appl. No. 15/152,430, filed May 11, 2016.

Dusanapudi et al., "Replicating Test Case Data Into a Cache and Cache Inhibited Memory" U.S. Appl. No. 15/207,669, filed Jul. 12, 2016.

Dusanapudi et al., "Testing Speculative Instruction Execution With Test Cases Placed in Memory Segments With Non-Naturally Aligned Data Boundaries" U.S. Appl. No. 15/344,768, filed Nov. 7, 2016.

Appendix P—List of IBM Patents or Patent Applications Treated As Related, dated Apr. 27, 2017.

Mutlu, Onur. 15-7 40/18-7 40 Computer Architecture Lecture 24: Prefetching. Carnegie Melon University, 2011.

Jegou, Yvon, and Olivier Temam. "Speculative Prefetching", Proceedings of the 7th International Conference on Supercomputing, ACM, 1993.

Prefetch Distance. High Performance Computer Architectures: A Historical Perspective. [retrieved on Mar. 19, 2018]. Retrieved from the Internet <URL: http ://homepages.inf.ed.ac.uk/cgi/mi/comp-arch.pl ?Stores/pref-dist.html,Stores/pref-dist-f.html,Stores/menu-pre.html>, 1996.

Dusanapudi et al., "Replicating Test Case Data Into a Cache With Non-Naturally Aligned Data Boundaries" U.S. Appl. No. 15/887,968, filed Feb. 2, 2018.

IBM, Appendix P—List of IBM Patents or Patent Applications Treated As Related, dated Mar. 2, 2018.

Eichenberger et al., Vectorization for SIMD Architectures with Alignment Constraints. ACM, PLDI'04, p. 82-93, Jun. 2004.

Adir et al., Genesys-Pro: Innovations in Test Program Generation for Functional Processor Verification. IEEE Design & Test of Computers, p. 84-93, 2004.

English Abstract of Korean Patent No. 101467623.

Zhu et al., "Class-based Cache Management for Dynamic Web Content." Twentieth Annual Joint Conference of the IEEE Computer and Communications Societies, IEEE INFOCOM 2001.

Lundqvist, Thomas, Data Cache Timing Analysis with Unknown Data Placement. vol. 9. Technical Report 02-11, Department of Computer Engineering, Chalmers University of Technology, Göteborg, Sweden, 2002.

McKinney et al. "DECchip 21066: the Alpha AXP Chip for Cost-Focused Systems." Compcon Spring'94, IEEE, 1994.

Maman, et al. "Reusable On-Chip System Level Verification for Simulation Emulation and Silicon." 2006 IEEE International High-Level Design Validation and Test Workshop, 2006.

Kadry et al. "Improving Post-silicon Validation Efficiency by Using Pre-generated Data." Hardware and Software: Verification and Testing, Springer International Publishing, p. 166-181, 2013.

English Abstract for Chinese Patent CN103140828A, Jun. 5, 2013.

Lozano et al., A Deeply Embedded Processor for Smart Devices, Smart Computing Workshops (SMARTCOMP 2014) p. 79-86, 2014.

IBM, "Method and apparatus for branch recovery in out of order dispatch and out of order retire instruction stream environment", IPCOM000125694D, Jun. 13, 2005.

Disclosed Anonymously, :Method and System for Defining a Stack Model and Tracking Changes to a Test Execution Stack, IPCOM000199695D, Sep. 15, 2010.

Disclosed Anonymously, "Method and System for Controlling Cache Interaction Among Arbitrary Hardware Verification Tools", IPCOM000196688D, Jun. 11, 2010.

Gay et al., Stack Allocating Objects in Java, retrieved from: citeseerx.ist.psu.edu, Jan. 1999.

Disclosed Anonymously, "A method and system to intelligently evolve test cases", IPCOM000240119D, Jan. 5, 2015.

Dusanapudi et al., "Stress Testing a Processor Memory With a Link Stack" U.S. Appl. No. 15/804,512, filed Nov. 16, 2017.

IBM, Appendix P—List of IBM Patents or Patent Applications Treated As Related, dated Jan. 31, 2018.

* cited by examiner

|  | Col 1 | Col 2 | Col 3 | Col 4 | Col 5 | Col 6 | Col 7 |
|---|---|---|---|---|---|---|---|
| Row 1 | a1 | a2 | a3 | a4 | a5 | a6 | bc +112 |
| Row 2 | b1 | b2 | b3 | b4 | b5 | b6 | bc +112 |
| Row 3 | bcl tgt | bcl tgt | bcl tgt | nop | nop | nop | bc next |
| Row 4 | mfLR r3 | push | sub call | nop | pop | unused | LR save area |
| Row 5 | c1 | c2 | c3 | c4 | c5 | c6 | bc +112 |
| Row 6 | d1 | d2 | d3 | d4 | d5 | d6 | return |
| Row 7 | e1 | e2 | e3 | e4 | e5 | e6 | bc +112 |
| Row 8 | f1 | f2 | f3 | f4 | f5 | f6 | return |
| Row 9 | g1 | g2 | g3 | g4 | g5 | g6 | bc +112 |
| Row 10 | mfLR r3 | push | sub call | nop | pop | unused | LR save area |
| Row 11 | h1 | h2 | h3 | h4 | h5 | h6 | bc +112 |
| Row 12 | i1 | i2 | i3 | i4 | i5 | i6 | return |

STRESS TESTING A PROCESSOR MEMORY WITH A LINK STACK

BACKGROUND

1. Technical Field

This disclosure generally relates to computer hardware testing and development, and more specifically relates to a system and method for stress testing a processor memory with a link stack using link stack test segments with non-naturally aligned data boundaries.

2. Background Art

Processor testing tools attempt to generate the most stressful test case for a processor. In theory, the generated test case should provide maximum test coverage and should be able to stress various timing scenarios and operations on the processor, including the coherency of cache memory. Coherency in the cache memory involves insuring that changes to data in the cache are accurately reflected to main memory to keep the data consistent. Building test cases to thoroughly test a processor can be extremely costly in time and resources, thus building efficient test cases that can reuse test code is an important goal of processor testing.

Many processors have a link stack that stores return addresses when executing a branch in the code. A link register is typically used to access the last entry into the link stack. The processor may make predictions of software execution based on the content of the link stack to speed execution. Also, there are often limits to the depth of the link stack. Accommodations in the test software must be made to deal with errors that may be generated when the link stack depth is exceeded. It is very difficult to generate test cases for memory that can also test the different scenarios of the link stack depth. Prior art test case generation was extremely labor intensive to develop stress tests for memory with different link stack depth scenarios.

BRIEF SUMMARY

A processor memory is stress tested with a variable link stack depth using link stack test segments with non-naturally aligned data boundaries. Link stack test segments are interspersed into test code of processor memory tests to change the link stack depth without changing results of the test code. The link stack test segments are the same structure as the segments of the test code and have non-naturally aligned boundaries. The link stack test segments include branch to target, push/pop, push and pop segments. The depth of the link stack is varied independent of the memory test code by changing the number to branches in the branch to target segment and varying the number of the push/pop segments.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for stress testing a processor memory with a variable link stack depth using link stack test segments with non-naturally aligned data boundaries. Link stack test segments are interspersed into test code of processor memory tests to change the link stack depth without changing results of the test code. The link stack test segments are the same structure as the segments of the test cases and also have non-naturally aligned boundaries. The link stack test segments include branch to target, push/pop, push and pop segments. The depth of the link stack is varied independent of the memory test code by changing the number to branches in the branch to target segment and varying the number of the push/pop segments.

Figure 1:
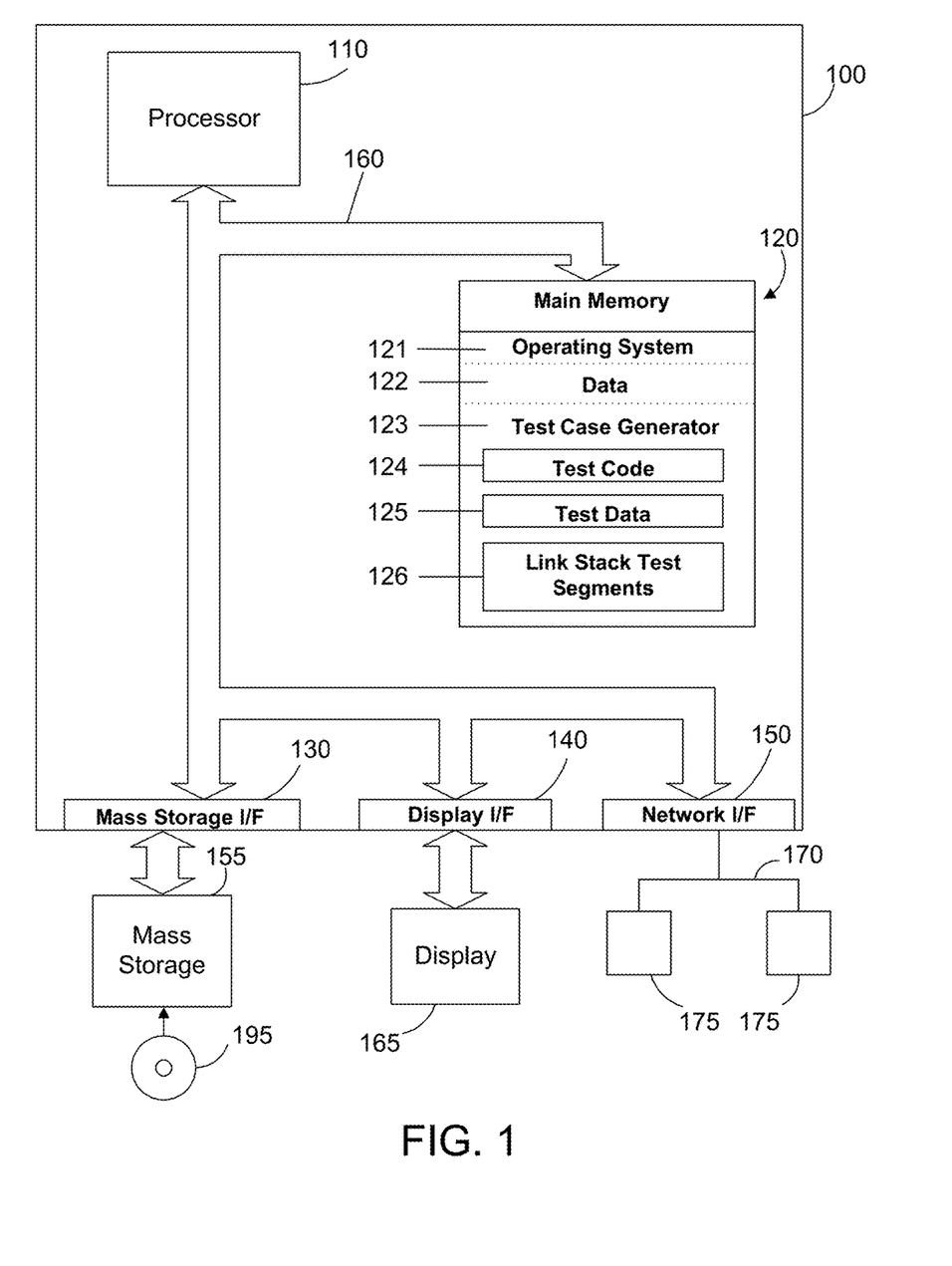
FIG. 1 is a block diagram a computer system with a test case generator as described herein to generate test code and place it in segments of a data cache with non-naturally aligned data boundaries.

Referring to FIG. 1, a computer system 100 is one suitable implementation of a computer system that is capable of performing the computer operations described herein including a test case generator for generating test cases for stress testing a processor memory and/or a test case executor as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and a test case generator 123. The memory 120 also includes test code 124 and test data 125 which is typically created by the test case generator 123. The memory also includes link stack test segments 126 for testing the memory with different link stack scenarios as described herein.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, data 122, test case generator 123, test code 124, test data 125 and link stack test segments 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the test case generator 123 to generate the test code 124 and the test data 125 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
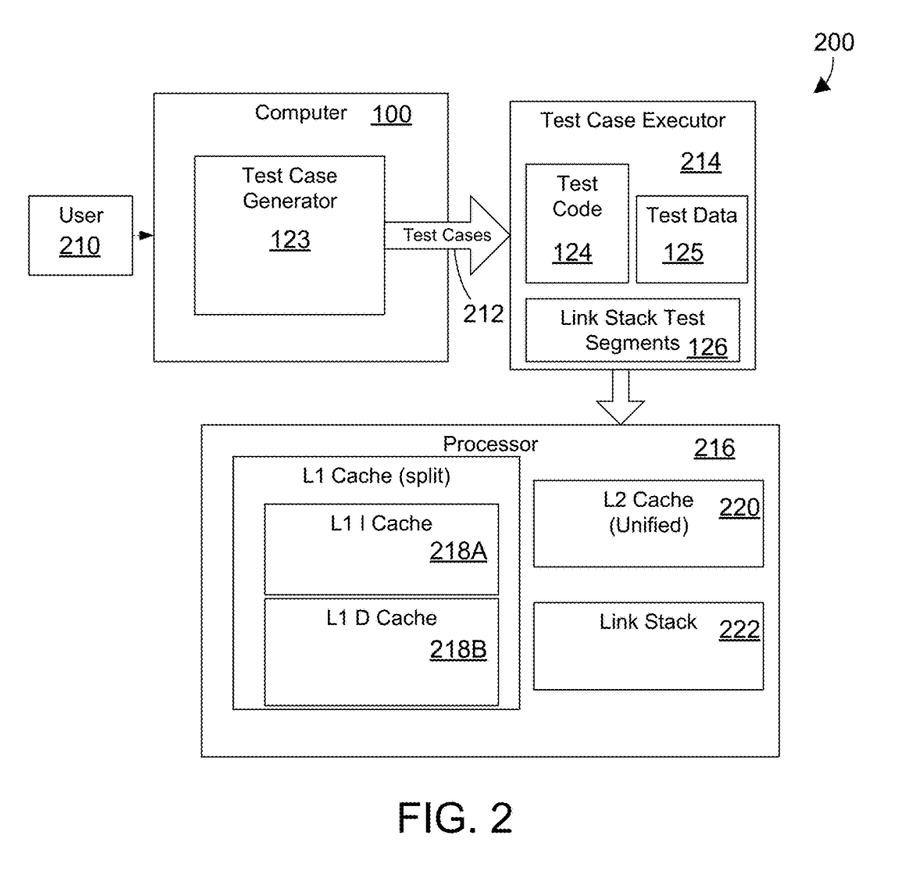
FIG. 2 illustrates simplified block diagrams of a system for testing a processor with test code and link stack test segments placed in segments of a cache with non-naturally aligned data boundaries.

FIG. 2 illustrates a simplified block diagram of a system 200 for reducing the time needed to generate test cases for testing a processor by replicating test code and test data and placing slices of the test code and test data into a memory cache where the slices of the replicated test code and test data have non-naturally aligned data boundaries. A user 210 or an operator uses the test case generator 123 to provide tests cases 212 to a test case executor 214. The test case generator 123 and the test case executor 214 operate in a manner similar to the prior art except as described herein. The test cases 212 include test code 124 and test data 125. The test case executor 214 loads the test code 124, test data 124 and the link stack segments 126 into a processor 216 to verify and validate the processor design.

Again referring to FIG. 2, the processor 216 has a typical cache design with one or more caches. In the illustrated example, the processor 216 has a split L1 cache 218 and a unified L2 cache 220. The split L1 cache 218 means the L1 cache 218 is split between an L1 instruction cache 218A and an L1 data cache 218B. When instructions and data are needed by the processor, the processor first looks to the L1 cache 218 to load the instructions and data. If the needed instructions and data are not in the L1 cache 218, then the L2 cache is searched for the needed instructions and data and loaded into the L1 cache from the L2 cache if available. If the needed instructions and data are not in the L2 cache, then they are loaded from main memory. Alternatively an additional level of cache (L3 cache) can be used but is not shown here for simplicity. The test code 124 and test data 125 are loaded into the L2 cache 220 and then to the L1 cache 218 as described further below. The test case executor 214 replicates the test code 124, placing multiple copies of the test code into the L2 cache 220, and then the test code is executed by the processor to test proper handling of data coherency as described further below. The test case executor 214 may also replicate the test data 125 into the L2 cache 220. The processor 216 further includes a link stack 222 or call return stack that can be used to predict a target address of a branch to improve performance.

Figure 3:
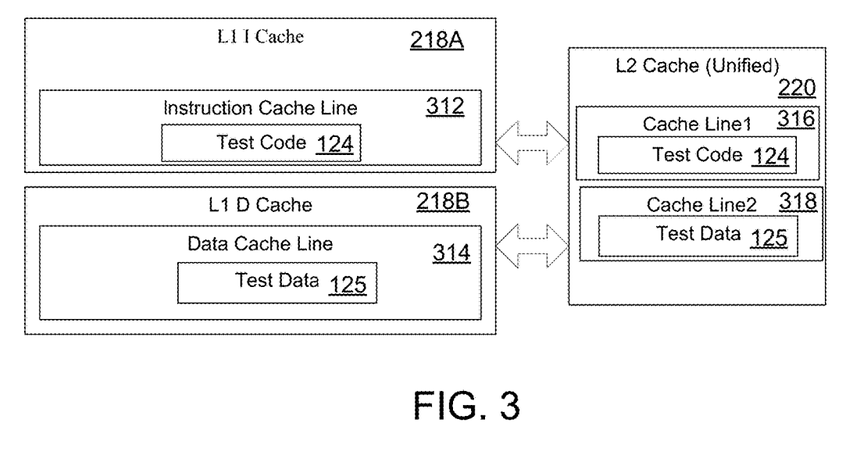
FIG. 3 is a simplified block diagram of a memory cache system in a processor with test code and test data placed in different cache lines in a level two memory cache.

FIG. 3 illustrates an example of loading the L1 cache 218 from the L2 cache 220 of the processor 216 (shown in FIG. 2) where the test code and test data are initially placed in different cache lines in the L2 memory cache. In this example, the L1 instruction cache 218A has a single instruction cache line 312. Similarly, the L1 data instruction cache 218B has a single data cache line 314. Those of ordinary skill in the art will recognize that processors may have multiple cache lines in the instruction cache and the data cache. In such a case, the operation would be similar to the described example. In this example, the test code 124 was initially loaded into cache line1 316. When test code 124 is requested by the L1 instruction cache 218A, the L2 cache 220 provides a cache line containing the requested test code, in this case test code 124 from cache line1 316. Similarly, the test data 125 was initially loaded into cache line2 318. When test data 125 is requested by the L1 data cache 218B, the L2 cache 220 provides a cache line containing the test data 125 from cache line2 318. If the test code makes changes to the test code 124 in the instruction cache line 312 or makes changes to the test data 125 in the data cache line 314 then these changes need to be pushed back to the L2 cache 220 in a manner known in the prior art. Since the test code 124 and the test data 125 are on different cache lines, this example illustrates the simple case of maintaining memory coherency between the L1 and L2 caches. If the processor or test code detects an error in data coherency between the caches or main memory, the processor being tested can be flagged as having a potential memory failure in a manner known in the prior art.

Figure 4:
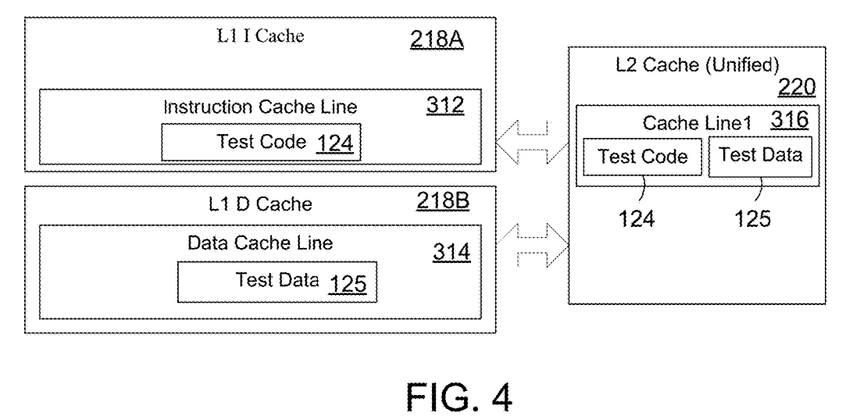
FIG. 4 is a simplified block diagram of a memory cache system in a processor with test code and test data placed in the same cache lines in a level two memory cache.

FIG. 4 illustrates another example of loading the L1 cache 218 from the L2 cache 220 of the processor 216 (shown in FIG. 2). In this example, the test code and test data are initially placed in the same cache line in the L2 memory cache. As in the previous example, the L1 instruction cache 218A and the L1 data instruction cache 218B each have a single cache line. In this example, the test code 124 was initially loaded into cache line1 316. When test code 124 is requested by the L1 instruction cache 218A, the L2 cache 220 provides the test code 124 from cache line1 316. The test data 125 was initially loaded into the same cache line1 316. When test data 125 is requested by the L1 data cache 218B, the L2 cache 220 provides the test data 125 from cache line1 316. If the test code makes changes to the test code 124 in the instruction cache line 312, or if the test code makes changes to the test data 125 in the data cache line 314 then these changes need to be reflected in the L1 cache and pushed back to the L2 cache 220. This example illustrates the case of maintaining memory coherency between the L1 and L2 caches where test code 124 and the test data 125 are loaded into the L1 cache 218 from the same cache lines in the L2 cache 220.

Figure 5:
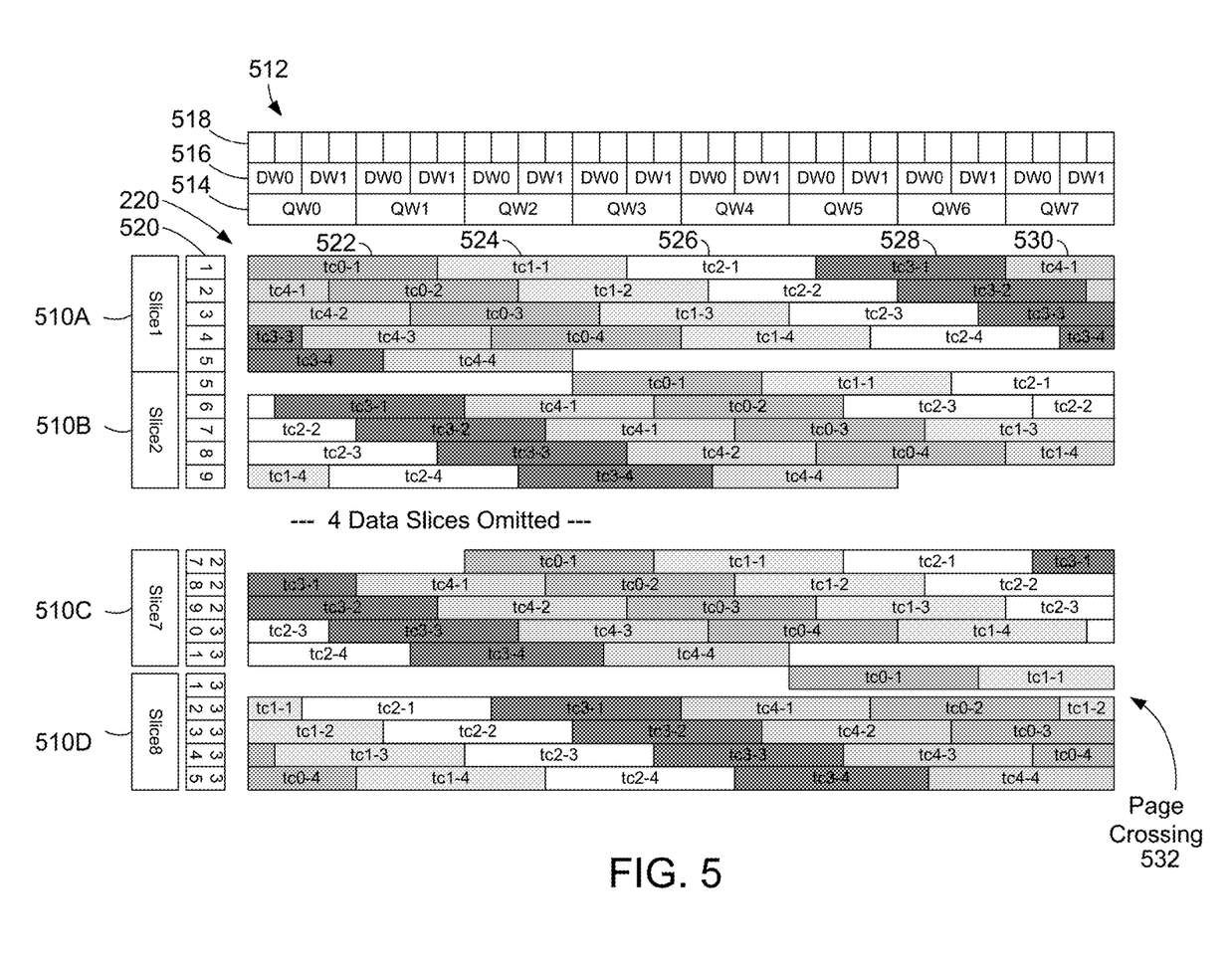
FIG. 5 illustrates successive slices of replicated test code and test data stored in a memory cache with non-naturally aligned data boundaries.

FIG. 5 illustrates additional detail of successive slices of the L2 memory cache with replicated test cases (tc0-1, tc1-1, etc.) placed in segments of memory with non-naturally aligned data boundaries. Thus, FIG. 5 represents a simplified representation of a portion of the level 2 cache 220 introduced above. In the illustrated example, the cache 220 illustrates four replicated slices 510 that can contain test code or test data (described further below). The table 512 above the cache data illustrates how the cache lines of the cache are divided. A cache line in the cache is divided into eight quad words 514. The quad words 514 are labeled QW0 through QW7. Each quad word 514 is divided into two double words 516. The double words for each quad word are labeled DW0 and DW1. Each double word 516 is further divided into two words 516 (not labeled). In this example, each word is four bytes of memory space. Thus each cache line has eight quad words with 128 bytes of memory. Thus the level 2 cache 220 is divided into lines of memory 520 with 128 bytes in each line. In the illustrated portion of level 2 cache 220 shown in FIG. 5, lines 1-9 and 27-35 are shown with the line number 520 shown for each line at the left side of the drawing.

Again referring to FIG. 5, the memory represented in the level 2 cache 220 is divided into slices 510 as shown. For simplification of the drawing, only four slices of the memory cache are actually shown. Slices 3 through 6 are omitted from the drawing but follow the same pattern as the other slices. Slice1 510A begins on line1 of the cache and ends near the middle of line 5. Line 5 is shown twice at the left of the drawings. This is done for illustration so that it can be clearly seen where slice1 510A ends and slice2 510B begins. In the cache there is actually only one line of memory designated as line 5. Slice2 510B begins at the end of slice1 510A near the middle of line 5 and ends near the end of line 9. Slice7 510C begins at the end of slice6 (not shown) near the middle of line 27 and ends near the end of line 31. Slice8 510D begins at the end of slice1 510C near the middle of line 31 and ends at the end of line 35.

Again referring to FIG. 5, each slice of memory 510 includes several strands of test cases. In this example, there are five strands of test cases (tc0 through tc4) divided into four segments each. The segments of each strand are shown with the same shading in FIG. 5. The segment of the strand is indicated by the number after the dash. Thus tc0-1 522 is the first segment of test case zero, tc1-1 524 is the first segment of test case one, tc2-1 526 is the first segment of test case 2, tc3-1 528 is the first segment of test case 3 and tc4-1 530 is the first segment of test case four. Test case zero (tc0) includes tc0-1, tc0-2, tc0-3 and tc0-4. Similarly the other test case strands include four segments. As can be seen using the table 512 above the cache, each of the segments has a test case that is seven words long. It is important to note that the seven word length of the segments means that each of the test cases are on non-naturally aligned word boundaries. Non-naturally aligned means that when the segments of the test cases are placed end-to-end the end of the segments does not fall on a natural boundary that is a number of the form $2^n$. This is accomplished by having segments with an odd number of words. In this example this means that the beginning and end of each of the test case segments does not line up with 32 byte, cache line (128 byte) and page crossing boundaries. For example, the page crossing boundary 532 is within the test case tc1-1 at the boundary between line 31 and line 32 as shown in FIG. 5. Since the segments are non-naturally aligned, after replication alignment boundaries change for tests on subsequent segments to allow more robust testing of the processor using the same repeated test code. In cases where alignment boundaries need to be respected for a few instructions, these instructions are placed in sub-segments with special alignment locations so that they preserve alignment even after replication and re-execution on new segments as described below.

Figure 6:
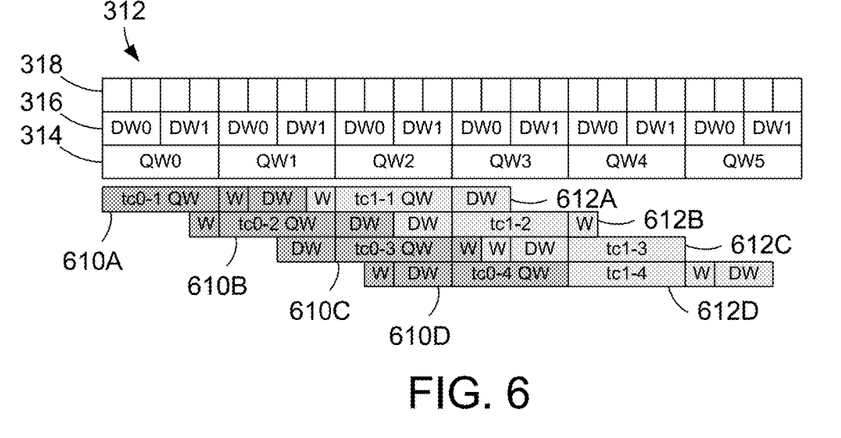
FIG. 6 further illustrates the test code segments in FIG. 5 having non-naturally aligned data boundaries.

FIG. 6 further illustrates a portion of the memory cache shown in FIG. 5 having test cases with test code and test data on non-naturally aligned data boundaries. FIG. 6 illustrates the first two strands of the five strands of test cases shown in FIG. 5, namely tc0 610 and tc1 612. Test case zero (tc0) 610 includes four segments 610A, 610B, 610C and 610D. Similarly, test case one (tc1) 612 includes four segments 612A, 612B, 612C and 612D. As described above, each segment of the cache has a test case that is seven words long. The test case segment is divided into three sub-segments. In this example, the sub-segments include a quad word, a double word and a single word for a total of seven words. The order of the sub-segments changes for each segment in the test case strand in order that the test cases within the strings can observe word boundaries where needed. The first segment 610A of test case zero (tc0) has a quad word followed by a word and then a double word. In the next segment of tc0 610B there is a word, a quad word and then a double word. In the next segment of tc0 610C there is a double word, a quad word and then a single word. In the final segment of tc0 610D there is a single word, a double word and then the quad word. Similarly the tc1 alternates the single word, double word and quad word in subsequent segments as shown in 612A, 612B, 612C and 612D.

In the example described above, each segment of the test cases has seven words to insure that the test case data has non-naturally aligned data boundaries. By having non-naturally aligned data boundaries for each segment of the slice of test data, testing can be done on the replicated test cases to test various boundaries. These boundaries include 32 byte boundaries, cache line boundaries (128 bytes) and page crossing boundaries. The test case segment is divided into sub-segments of word, double word and quad word and the order of the sub-segments changes for each segment in the test case strand. Dividing into sub-segments and changing of the order of the sub-segments insures that the data for test cases within the sub-strings can observe and preserve double word and quad word boundaries where needed. Using non-naturally aligned data boundaries with replicated code insures that all types of segments will cross the boundaries at some replication of the test data. This allows testing of the boundaries without using special code to look at the restrictions of a particular segment for each of the boundaries.

The examples described above illustrate a preferred test case segment with 7 words to achieve non-naturally aligned data boundaries. Other non-naturally aligned data boundaries could include other odd numbers such as 5, 9, 11, etc. A combination of word, double word and quad word could be chosen as sub-segments for these segments similar to the described example. For example, for a segment with 9 words, a quad word, two double words and a word would achieve the correct number of sub-segments for 9 words. The sub-segments could be changed for each segment in a strand as described above for the 7 word example.

Figure 7:
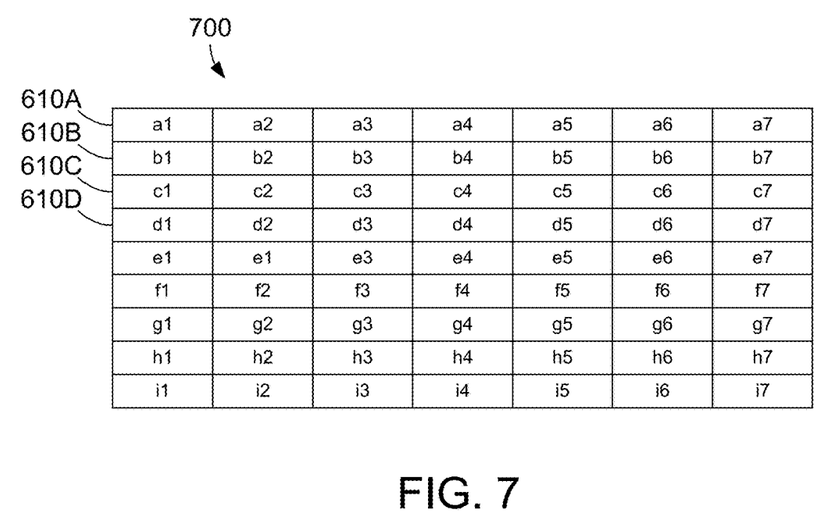
FIG. 7 illustrates a portion of the memory cache shown in FIG. 5 with a strand of memory shown as a single block.

FIG. 7 illustrates a portion of the memory cache shown in FIG. 5. The memory shown in FIG. 7 is a sequence of segments or a strand of memory 700 shown as a single block. The strand of memory 700 may be modified to include link stack scenarios to stress test memory and the link stack as described herein. In this example, the strand of memory 700 includes the strand segments 610 described in FIG. 6. Each of the segments in this example includes seven words of memory. Segment 610A includes seven words of memory a1 through a7. Similarly, segments 610B, 610C and 610D each include seven words of memory. Additional segments labeled as e, f, g, h, and i are also shown in the strand 700. These segments are not consecutive memory locations, but are shown here as a block of memory that are logically in the strand and used for testing the cache memory of the processor 216 (FIG. 2). In this example, each segment 610 of the strand 700 is loaded with a test case for testing memory by the test case executor 214 as described above. In addition, the test case executor 214 may load link stack test blocks into the strand 700 as described below.

Figure 8:
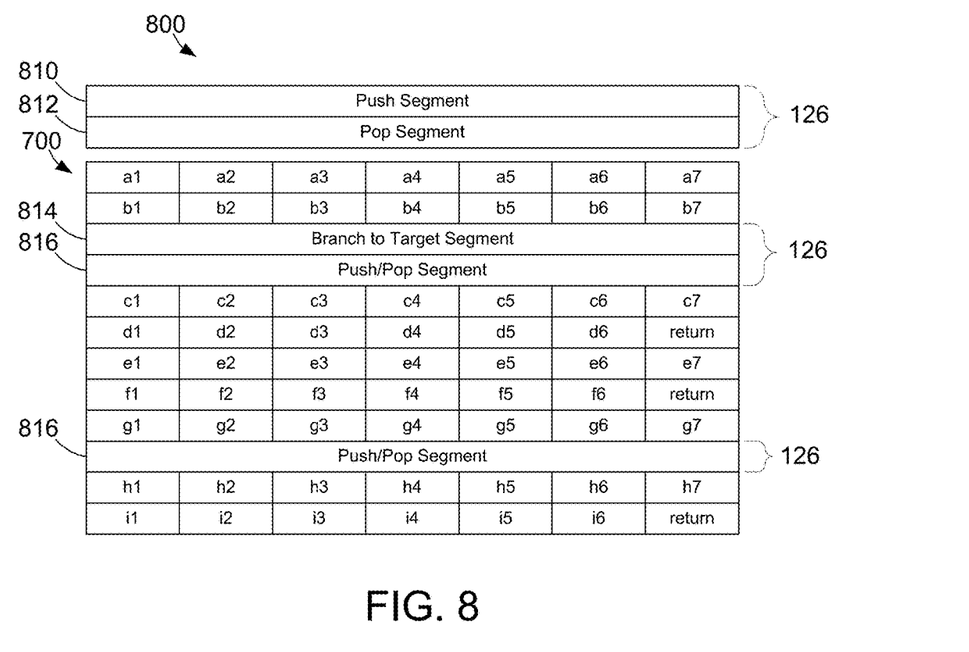
FIG. 8 illustrates another view of the same strand of memory shown in FIG. 7 modified to include link stack test segments to stress test memory with varying stack depth.

FIG. 8 illustrates another view of a portion of memory used for stress tests as described herein. FIG. 8 includes the same strand of memory 700 shown in FIG. 7 where the strand is arranged as a single block. In FIG. 8, the strand of memory 700 has been modified to include link stack test segments to stress test memory. The link stack scenarios are added to the test cases in the strand of memory 700 by adding link stack test segments 126. The link stack test segments 126 include a push segment 810 and a pop segment 812. The push segment 810 and the pop segment 812 are may be located at a suitable known location in memory and maybe outside the strand of memory 700. The same push segment 810 and the pop segment 812 may be used by multiple different test cases. The push segment 810 and the pop segment 812 are described further below. The stack test segments 126 further include a branch to target segment 814 with one or more corresponding push/pop segments 816. In this example, there are two push/pop segments 816. Each of the link stack test segments 126 is described further below.

Figure 9:
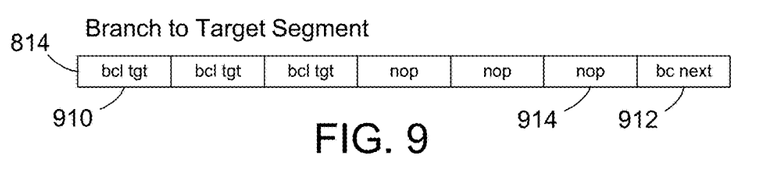
FIG. 9 illustrates an example of a branch to target segment.

FIG. 9 illustrates an example of a branch to target segment 814 introduced in FIG. 8. Like the all the link stack test segments 126, the branch to target segment 814 is a single segment. In the illustrated examples, the segments each have seven words with data or instructions. The branch to target segment 814 has one or more branch conditional link to target (bcl tgt) instructions 910. These bcl tgt instructions can also be considered as a sub-routine call. Thus the bcl tgt instructions 910 are branch instructions or subroutines calls that call target segments in the strand as described in the example below. In the illustrated example, all the bcl sub-routine calls 910 branch to "tgt" for illustration. In an actual implementation, these calls could have a unique target name. The last word 912 in the branch to target segment 814 is a branch instruction that branches to the next strand of test code shown in FIG. 5. Any unused words of the branch to target segment 814 are filled with no operation (nop) instructions 914.

Figure 10:
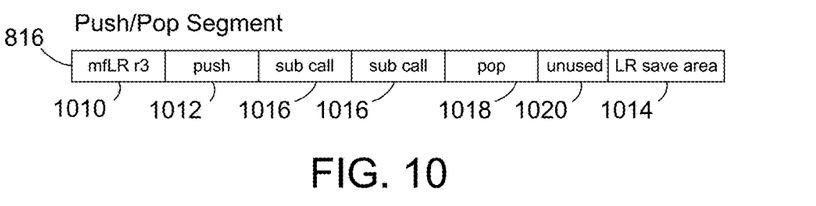
FIG. 10 illustrates an example of a push/pop segment.

FIG. 10 illustrates an example of a push/pop segment 816 introduced in FIG. 8. The push/pop segment 816 serves to increase the depth of the link stack to stress test the memory as described above. A link register in the processor holds the last entry of the link stack. Upon entry into the push/pop segment 816, the link register holds the address of the instruction following the call to the push/pop segment 816. The first instruction, "mfLR r3" 1010, moves the contents of the link register to register r3. The next instruction 1012 is a sub-routine call to the push segment 810. The push segment 810 stores the contents of the register r3 in the LR save area 1014 as described below. The push/pop segment 816 then has one or two sub call instructions 1016. The sub call instruction 1016 branches to a sub-routine in the memory strand 700. Upon return from the sub-routine the next instruction is the pop instruction 1018. The pop instruction 1018 is a branch to the pop segment 812. Branching to the pop segment returns instruction flow to the address stored in the LR save area 1014 as described below. The push/pop segment may have an unused location 1020. The push/pop segment 816 increases the stack depth by making a call to the push segment. Any testing done after the call to the push segment 816 has a stack depth increased by one. Adding additional push/pop segments allows the test programmers to force the testing to be done at any desired stack depth.

Figure 11:
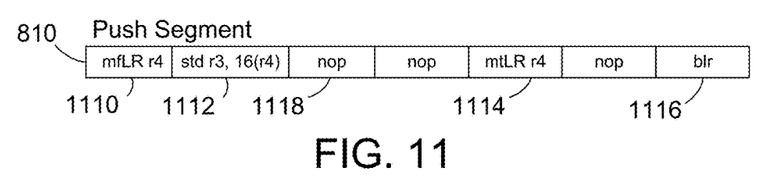
FIG. 11 illustrates an example of a push segment.

FIG. 11 illustrates an example of a push segment 810 introduced in FIG. 8. The purpose of the push segment is to store a return address for a corresponding pop segment 812. The push segment 810 stores the return address in a link register (LR) save area 1014 in the push/pop segment 816 that called the push segment 810 as described above. When the push segment 810 begins, register r3 already contains the return address to be stored (see the first instruction of the push/pop segment 816). The first instruction of the push segment 810 is "mfLR r4" 1110. This first instruction is a "move from link register" instruction. The instruction thus moves the contents of the link register to register r4 of the processor. The link register holds a return address to continue execution following a branch. In this case, the link register holds the address pointing to the next instruction inside the push/pop segment that called the push segment. Thus the link register holds the address to the "sub call" instruction in the push/pop segment. The address of the LR save area 1014 where the return address is to be stored is 16 bytes beyond this address in the link register. Thus, the store instruction "std r3, 16(r4)" 1112 stores the contents of register r3 at the address in register r4 plus 16 bytes. The move to link register instruction 1114 moves the contents of register r4 to the link register. This restores the link register to point to the address just as it was prior to the instruction 1110. The branch instruction 1116 then branches using the restored link register to branch back to the next instruction in the push/pop segment that called the push segment 810.

Figure 12:
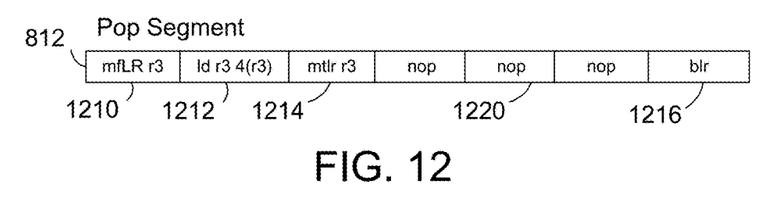
FIG. 12 illustrates an example of a pop segment.

FIG. 12 illustrates an example of a pop segment 812 introduced in FIG. 8. The purpose of the pop segment is to retrieve the return address from the LR save area 1016 and then branch back to the instruction subsequent to the branch call that originally called the push/pop segment. Thus the pop segment 812 does the inverse of the push segment 810. The first instruction of the pop segment 812 is "mfLR r3" 1210. This instruction moves the contents of the link register to register r3 of the processor. The link register holds the address pointing to the next instruction inside the push/pop segment that called the pop segment 812. Thus the link register holds the address to the "unused" instruction in the push/pop segment. The address of the LR save area 1014 where the return address is stored is 4 bytes beyond this address in the link register. Thus the load instruction "ld r3, 4(r3)" 1212 loads register r3 with the address stored in register r3 plus 4 bytes, which is the return address stored in the LR save area 1016. The move to link register instruction 1214 moves the contents of register r3 to the link register. This restores the link register to point to the address just as it was prior to the instruction 1210. The branch instruction 1216 then branches using the restored link register to branch back to the next instruction prior to branching to the push/pop segment, which in some cases will be the next bcl target instruction in the bcl target segment 814. Any unused words of the pop segment 812 may be filled with no operation (nop) instructions 1220.

Figure 13:
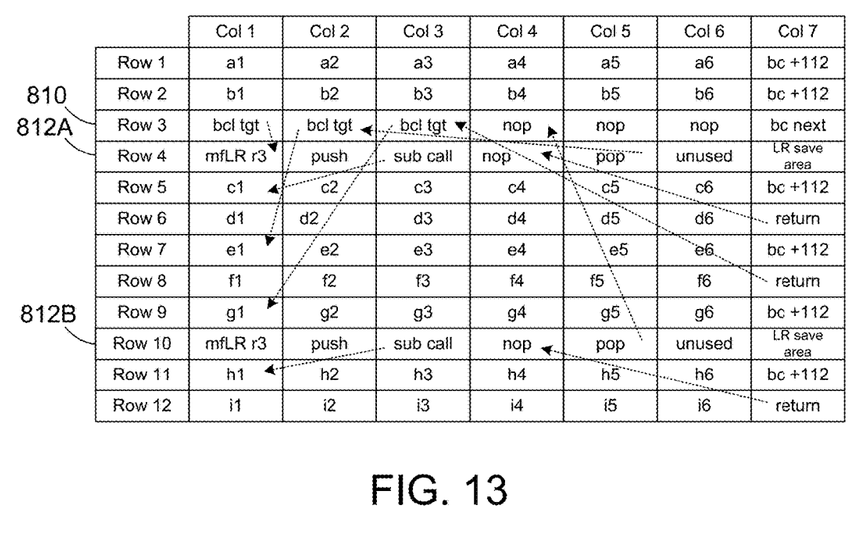
FIG. 13 illustrates an example of stress testing a processor memory with a link stack using link stack test segments with non-naturally aligned data boundaries.

FIG. 13 illustrates an example of stress testing a processor memory having a link stack using link stack test segments with non-naturally aligned data boundaries. FIG. 13 represents the strand of memory 700 as described in FIG. 8. Row and column numbers have been added to allow reference to each memory location. In the example of FIG. 13, the strand of memory 700 has been filled with a specific example of a bcl target segment 810 and push/pop segments 812A and 812B. In this example, we assume execution of the tests begin at instruction a1 (col. 1, row 1). The last instruction of the first segment includes a branch instruction bc+112 (col. 7, row 1). This instruction causes execution to advance 112 bytes forward to continue with the first instruction of the next segment of this strand (col. 1, row 2). The second row is executed similar to the first row. Execution then advances to the branch to target segment 810. The first instruction is a branch to target (col. 1, row 3). As used in this example, branch to target (bcl tgt) means branch to the location pointed to by the arrow.

Continuing with the example of FIG. 13, the first instruction in the branch to target segment 810 indicates to branch to col. 1, row 4. The instruction at this location moves the contents of the link register to register r3. Register r3 will now hold the address of col. 2, row 3, which is the next address from the branch instruction. The next instruction is the push call at col. 2, row 4. This is a branch instruction to the push segment 810 described above with reference to FIG. 11. The push segment 810 stores the address in register r3 in the LR save area (col. 7, row 4) of this segment as described above. After the push call, the subroutine call (col. 3, row 4) branches execution to c1 (col. 1, row 5). Execution continues through rows 5 and 6 until the return instruction (col. 7, row 6) branches execution to the nop instruction (col. 4, row 4). The next instruction is then the pop branch instruction (col. 5, row 4). The pop branch instruction branches execution to the address stored in LR save area by the push segment as described above. In this case, the pop branch instruction causes execution to continue with the second "bcl tgt" instruction (col. 2, row 3). The second "bcl tgt" instruction (col. 2, row 3) causes execution to branch to instruction e1 (col. 1, row 7). Execution then continues from e1 through instruction f6 and then returns to the third "bcl tgt" instruction (col. 3, row 3). The third "bcl tgt" instruction branches execution to instruction g1 (col. 1, row 9). After instruction g6, the branch (col. 7, row 9) sends execution to the second push/pull segment 812B. This push/pull segment 812B operates similar to the previous one. After pushing the link register contents to the LR save area (col. 7, row 7) execution continues with the test code in rows 11 and 12. The return (col. 7, row 12) branches execution to the nop instruction (col. 4, row 10) and then to the pop branch instruction (col. 5, row 10). The pop instruction (col. 5, row 10) sends execution to the nop instruction (col. 4, row 3) in the branch to target segment 810. Execution then continues in row 3 to the "bc next" instruction (col. 7, row 3) that branches to the next strand of the tests.

In the example described above with reference to FIG. 13, it can be seen that the addition of the link stack segments, including the branch to target segment 810 and the push/pull segments 812A, 812B can be done such that they do not affect the execution of the original block of tests a1-a6 through i1-i6 as shown in FIG. 7. The addition of the link stack segments 126 serve to modify the depth of the link stack for stress testing the link stack hardware without changing the results or requiring the substantive modification of the general test software used for the memory cache testing. The sequence of the test code stays the same but the stack depth is increased. In the above example, the only changes to the general test software were to change the final instruction from a branch to the next segment (bc+112) to a return instruction to match the sub-routine calls in the push/pop segment and the bcl target instructions (subroutine calls) in the branch to target segment 810. Changing the last instruction to a "return" may be done pseudo randomly to further randomize the stack depth of the test code. No substantive changes were made to the general test software. Thus, any number of branch to target segments 810 and push/pull segments 812A, 812B can be added to put the depth of the link stack to various values during testing without substantive modification of the test code.

Figure 14:
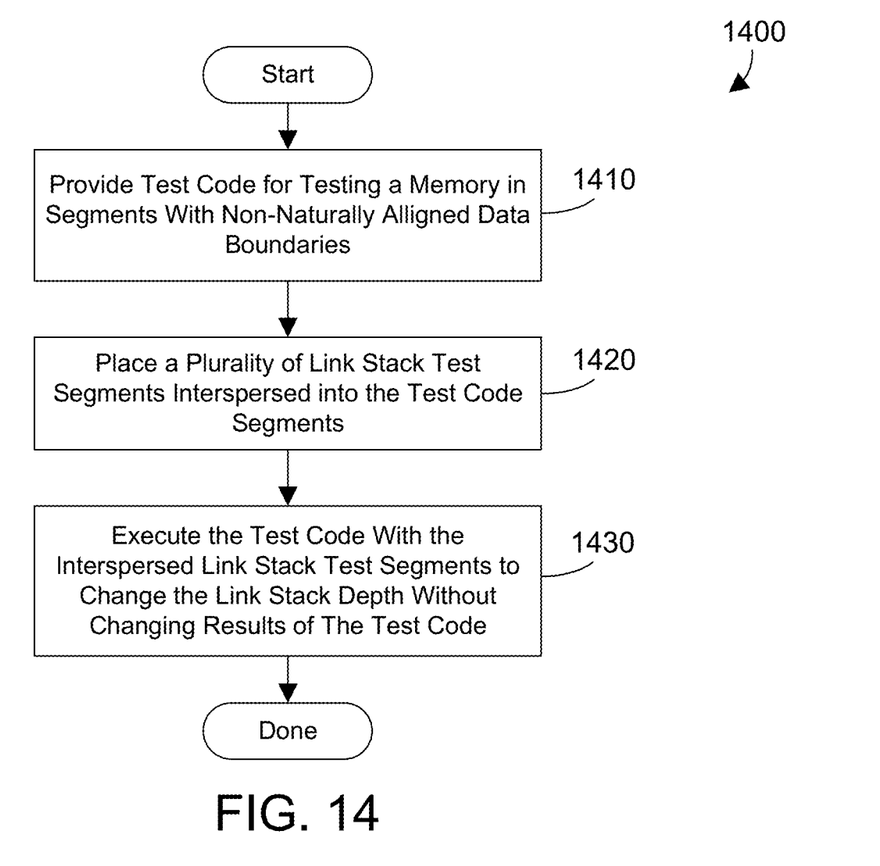
FIG. 14 is a flow diagram of a method for stress testing a processor memory cache with a variable link stack depth using link stack test segments with non-naturally aligned data boundaries.

Referring to FIG. 14, a method 1400 shows one suitable example for an example of stress testing the link stack in a processor memory cache using segments with non-naturally aligned data boundaries. Portions of method 1400 are preferably performed by the test case generator 123 shown in FIG. 1 and the test case executor 214 shown in FIG. 2. First, provide test code for testing a memory in a strand of non-consecutive memory segments with non-naturally aligned data boundaries (step 1410). Next, place a plurality of link stack test segments interspersed into the test code segments (step 1420). Execute the test code to test the memory while executing the interspersed push and pop segments to vary the link stack depth without changing results of the test code and independent of the test code (step 830). Method 1400 is then done.

Figure 15:
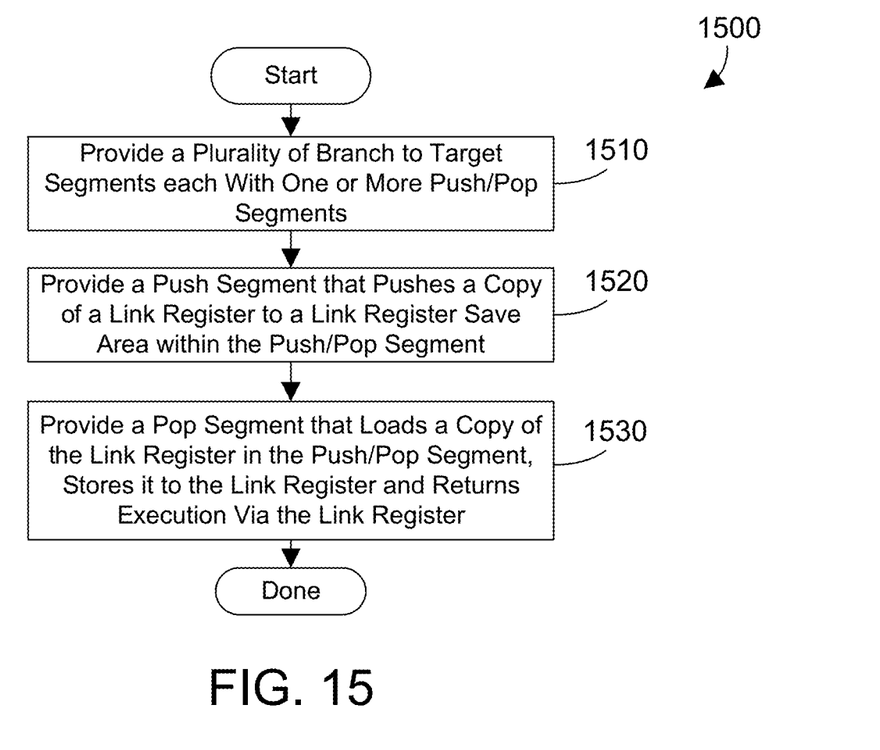
FIG. 15 is a flow diagram of a specific method for step 1420 in FIG. 14.

FIG. 15 shows one suitable example of a method 1500 to place a plurality of link stack test segments interspersed into the test code segments. Method 1500 thus shows a suitable method for performing step 1420 in method 1400 in FIG. 14. First, provide a plurality of branch to target segments each with one or more push/pop segments (step 1510). Provide a push segment that pushes a copy of a link register to a link register save area within the push/pop segment (step 1520). Provide a pop segment that loads a copy of the link register from the link register save area in the push/pop segment and stores it to the link register, and then returns execution via the link register (step 1530). The method 1500 is then done.

The disclosure and claims herein relate to a system and method for stress testing a memory with a variable link stack depth using link stack test segments with non-naturally aligned data boundaries. Link stack test segments are interspersed into test code of a processor memory tests to change the link stack depth without changing results of the test code. This allows the test code to be reused for different test scenarios including testing of the link stack.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for testing a computer processor comprising:
   providing test code in a plurality of segments with non-naturally aligned boundaries, wherein non-naturally aligned means ends of the segments when placed end-to-end with another segment do not fall on a natural boundary that is a number of the form $2^n$;
   placing a plurality of link stack test segments that are non-naturally aligned interspersed into the test code segments; and
   executing the test code with the interspersed link stack test segments to change a link stack depth without changing results of the test code.

2. The method of claim 1 wherein the test code in the non-naturally aligned segments comprise sub-segments of test code that include word, double word and quad word sub-segments.

3. The method of claim 2 wherein test code in the non-naturally aligned segments have seven words of test code with one single word sub-segment, one double word sub-segment and one quad word sub-segment.

4. The method of claim 1 wherein the step of placing a plurality of link stack test segments that are non-naturally aligned interspersed into the test code segments further comprises:
   providing a plurality of branch to target segments that comprises a plurality of branches to sub-routines of test code; and
   wherein each branch to target segment has one or more push/pop segments that branches to a push segment, branches to a test segment, and then branches to a pop segment.

5. The method of claim 1 wherein the step of placing a plurality of link stack test segments that are non-naturally aligned interspersed into the test code segments further comprises providing a push segment that pushes a copy of a link register to a link register save area within the push/pop segment.

6. The method of claim 5 wherein the step of placing a plurality of link stack test segments that are non-naturally aligned interspersed into the test code segments further comprises providing a pop segment that loads a copy of the link register in the push/pop segment, stores it to the link register and returns execution via the link register.

7. The method of claim 1 wherein the push segment and the pop segment are located outside the test code and used by a plurality of test cases.

8. The method of claim 1 wherein a last instruction of one or more test code segments is modified to change a branch location consistent with subroutine calls in the push/pop segment and the branch to target segment.

9. The method of claim 1 wherein the test case executor that replicates the test code and loads the replicated test code into non-naturally aligned segments of consecutive memory locations of a level two cache on the computer processor; and
   wherein the computer processor executes the test code on a first test case and causes the processor to load a same cache line to a level one instruction cache and a level one data cache on the processor to test the processor.

10. A computer-implemented method executed by at least one processor for testing a computer processor comprising:
    providing test code in a plurality of segments with non-naturally aligned boundaries, wherein non-naturally aligned means ends of the segments when placed end-to-end with another segment do not fall on a natural boundary that is a number of the form $2^n$, wherein test code in the non-naturally aligned segments have seven words of test code with one single word sub-segment, one double word sub-segment and one quad word sub-segment;
    placing a plurality of link stack test segments that are non-naturally aligned interspersed into the test code segments comprising:
       providing a plurality of branch to target segments that comprises a plurality of branches to sub-routines of test code;
       wherein each branch to target segment has one or more push/pop segments that branches to a push segment, branches to a test segment, and then branches to a pop segment;
       wherein the push segment that pushes a copy of a link register to a link register save area within the push/pop segment,
       wherein the pop segment that loads a copy of the link register in the push/pop segment, stores it to the link register and returns execution via the link register; and
    executing the test code with the interspersed link stack test segments to change a link stack depth without changing results of the test code.

11. The method of claim 10 wherein a last instruction of one or more test code segments is modified to change a branch location consistent with subroutine calls in the push/pop segment and the branch to target segment.

12. The method of claim 10 wherein the test case executor that replicates the test code and loads the replicated test code into non-naturally aligned segments of consecutive memory locations of a level two cache on the computer processing device; and
    wherein the computer processing device executes the test code on a first test case and causes the processor to load a same cache line to a level one instruction cache and a level one data cache on the processor to test the processor.

* * * * *